Feb. 1, 1966     J. A. FINNERAN     3,232,984
LOW BIURET UREA
Filed Nov. 20, 1961
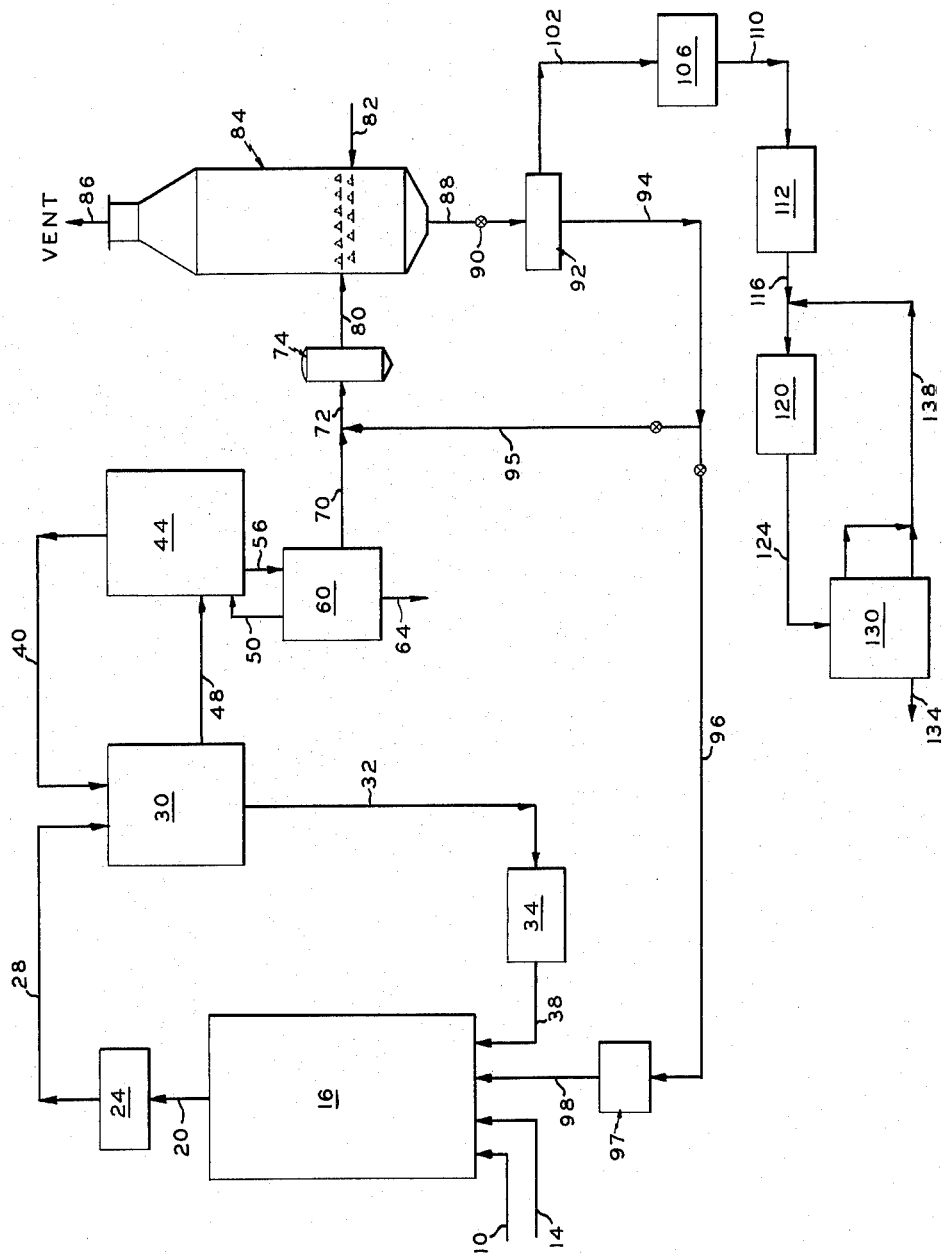
INVENTOR.
JAMES A. FINNERAN
BY G.H. Palmer
John C. Quinlan
ATTORNEYS

3,232,984
LOW BIURET UREA
James A. Finneran, Garden City, N.Y., assignor to Pullman Incorporated, a corporation of Delaware
Filed Nov. 20, 1961, Ser. No. 153,500
5 Claims. (Cl. 260—555)

This invention relates to improvements in the production of urea by the high pressure process. According to one aspect, it relates to the production of urea in such a fashion that the biuret content of urea is economically reduced within the process. According to another aspect, it relates to the production of substantially pure urea.

Today, urea is produced commercially by reacting ammonia and carbon dioxide under conditions of elevated temperatures and pressures in a reactor lined with stainless steel. Temperatures between 300° and 500° F., and pressures between 1700 p.s.i.a. and 3500 p.s.i.a. are standard, although pressures up to 8000 p.s.i.a. are possible, as described in U.S. Patent 2,087,980. The conversion-per-pass through the reactor is from 15 to 65 percent, based on the ammonia feed, depending upon the conditions employed. The reactor effluent is reduced in pressure and is degassed by reduction in pressure and addition of heat. According to one widely used process, unconverted reactants, ammonia and carbon dioxide, are separated from the effluent as a gaseous phase, condensed to liquid carbamate, and recycled to the reactor as a liquid. Degassing and condensation take place in one or several stages, depending upon the degree of degassing and recycle desired. The degassed urea liquid is then concentrated to the desired degree and passed to a solid urea recovery unit wherein the urea is recovered either as crystals, granules, or prills.

Following the conversion in the synthesis reactor, the operating conditions required to prepare the urea in intermediate and final marketable form are such that a portion of the urea decomposes to biuret. In fact, biuret content of the reactor effluent is essentially doubled during the degassing and concentration steps of most commercial processes. Although the portion of urea which decomposes is only a relatively small portion of the whole, it is undesirable, nevertheless, since even small percentages of biuret in urea cause undesired results in commercial applications. Since biuret is toxic toward plants and animals, it must be minimized in urea utilized as fertilizers and as nutritional supplements. Biuret is also undesirable in textile applications because it causes turbidity and destroys the brilliancy of textile finishes.

An especially difficult problem arises with respect to obtaining low biuret urea in commercial installations where it is desired to crystallize the entire urea product rather than either to partially crystallize it and prill the remainder, or to prill the entire product. In the past, when it has been desired to crystallize the entire urea product, it was necessary either to allow biuret to concentrate in the mother liquor in the crystallizer thereby producing high biuret crystals, or to withdraw biuret-containing mother liquor as a waste product. Such expedients were necessary to produce low biuret crystals because of the equilibrium relationship between biuret in the mother liquor and biuret included in the urea crystals. The equilibrium is such that the percentage of biuret in the mother liquor is about 10 times that in the crystals and, as a consequence, as the biuret concentration in the liquor increases, urea crystallizes with a proportionally higher biuret content. Furthermore, the problem of economically producing low biuret crystals in large quantities has been placed in unexpected relief and enhanced in magnitude in view of a recent development of a compacting process whereby substantially non-caking granules are economically produced from urea crystals substantially unchanged in biuret content.

A major drawback to prior methods for reducing biuret in urea is that they are extrinsic or appended to the process itself, requiring additional processing of the urea product. Costly additional equipment and chemicals are necessary to the operation of these extrinsic methods and, consequently, they are not economically attractive. Furthermore, the final product so obtained is adulterated by residual chemicals.

An object of the present invention is to provide a process for the production of urea having an extremely low biuret content, which process overcomes the technical and economic disadvantages of prior art methods.

Another object is to provide a continuous and commercial scale process for the manufacture of low biuret urea.

Another object is to provide an improved method for the production of urea crystals, low in biuret.

Still another object is to produce substantially non-caking granules of urea, low in biuret.

Other objects of the present invention will be apparent to those skilled in the art from the accompanying specification and disclosure.

The objects of this invention are generally accomplished by reacting ammonia, carbon dioxide, and biuret-containing solutions of urea derived from a purification zone, hereinafter described, under conditions of elevated temperatures and pressures in order to produce urea. The reaction products are thereafter withdrawn to purification zones wherein urea is separated from unconverted reactants, concentrated, and then solidified. A urea solution, containing biuret formed at least partly in the purification steps, is returned for reaction with ammonia and carbon dioxide in the aforementioned fashion. By the process of this invention urea product of improved purity is obtained, and over-all process yields are enhanced.

According to a preferred embodiment of the process of the present invention the biuret-containing solution of urea derived from a purification zone is mother liquor withdrawn from a urea crystallization zone. The recycle liquor or other stream derived from a purification zone generally contains between about 70 and about 85 percent by weight urea and is maintained as hereinafter described between about 1 and about 6 percent by weight biuret, based on the urea present. In order to produce crystals with a biuret content less than about 0.2 percent by weight, however, it is necessary to maintain the biuret content of the recycle stream at a biuret content less than about 2 percent by weight, based on the urea in the stream. The recycle stream is maintained within the above-described limits of biuret content in the crystallizing operation by controlling the ratio of liquor recycled to the urea reaction zone to resident liquor, i.e., liquor which is not recycled to the reaction zone. This ratio of recycle to resident liquor is generally between about 0.2:1.0 and about 0.3:1.0 and preferably between about .05:1.0 and about 0.1:1.0.

The urea reaction zone, which usually comprises a reactor, is maintained under a pressure between about 1700 pounds per square inch absolute (p.s.i.a.) and about 3500 p.s.i.a., and at a temperature between about 300° and about 500° F. From the standpoint of optimizing the per-pass conversion of ammonia and yield of urea, preferred operating conditions include pressures between about 2,400 p.s.i.a. and about 3,000 p.s.i.a. and temperatures between about 330° and about 400° F. Feed to the synthesis reactor generally comprises ammonia, carbon dioxide, and the biuret-containing stream. In accordance with the preferred embodiment, in addition to the above-mentioned feed streams, carbamate recycle solution from a carbamate recovery zone or zones is also introduced into the urea reaction zone. Operating within the range of conditions of temperature and pressure set forth herein, the ratio of ammonia to carbon dioxide entering the reactor, on a mole basis, is maintained between about 15:1 and about 2:1. The ratio of ammonia and carbon dioxide, taken together, to biuret introduced into the reactor is very large, being within the ratio of between about 4,000:1 and about 12,000:1, on a mole basis. For operation of the reaction zone within the range of conditions hereinbefore set forth, and for residence times in the synthesis reactor between about ⅓ and about 3 hours, biuret concentration in the reactor effluent does not exceed a value of about 0.4 percent based on urea in the effluent.

Recycling biuret-containing urea to a synthesis reactor wherein urea is concomitantly produced from ammonia, carbon dioxide, and from biuret has many advantages over processes of the prior art. For example, recycling mother liquor from a crystallization zone to the synthesis reactor provides a method for controlling biuret content in the mother liquor in a more efficient and more economical fashion than prior processes. Instead of withdrawing biuret-containing urea to waste the entire urea content of the recycle is reclaimed thereby effecting substantially increased yields. Since this method does not depend upon reclamation of urea or removal of biuret by treatment with foreign substances the present method is complete within itself, an integral process avoiding the expense of costly extrinsic operations.

By providing an efficient and economical process for controlling biuret content of mother liquor in a crystallizer, the process of this invention achieves the production of large quantities of low biuret crystals which in turn allows for commercial scale production of low biuret and substantially noncaking granules of urea. Furthermore, since the process of this invention may be effected in plants operating on a total crystallization basis, the prilling operation and bulky process equipment associated therewith may be thereby eliminated.

Conversion of biuret-containing solutions to urea in the urea reaction zone is a significant advance over the prior art. The advantages of this process divide naturally into advantages in product quality and advantages in process economics. When compared with effecting this conversion by means extrinsic to the urea process such as, for example, if it were proposed to carry out the conversion of biuret back to urea in a zone separate and distinct from the urea reaction zone, additional capital would have to be invested in a second high pressure corrosion resistant vessel, capable of withstanding conditions similar to those employed in the urea synthesis, and in additional degassing equipment; but in addition to the initial capital expense, process disadvantages would also accrue by virtue of the necessary maintenance, utility, and depreciation expenses. Furthermore, the product of the present process is lower in biuret than the product of processes utilizing the extrinsic biuret reducing means hereinbefore mentioned primarily because of the important elimination in the present invention of an additional degassing step.

Surprisingly, the introduction into the urea reaction zone of urea and other material diluents along with the biuret-containing recycle stream does not cause diminished yields, as predicted by thermodynamic considerations such as, for example, phase equilibrium and phase dilution. In contradistinction, yields are actually enhanced.

For a better understanding of the present invention reference is now had to the accompanying figure of the drawing which illustrates a specific embodiment of the process of the present invention and is not to be construed as unnecessarily limiting thereto.

The principal elements of the urea synthesis process shown in the figure are the reaction section shown as reaction zone 16 and the purification section which comprises primary heating and carbamate condensing zone 30, secondary heating and carbamate condensing zone 44, urea concentrating and ammonia recovery zone 60, crystallizer 84 and centrifuge 92. Elements of the urea compacting process shown in the figure are crystal dryer 106, crystal cooler 112, crystal compacting and granulating machine 120, and screener 130. Briefly described, the flow of materials throughout the process is as follows:

Urea is produced in reaction zone 16 from carbon dioxide, ammonia, biuret-containing liquor, and ammonium carbamate introduced into zone 16 through lines 10, 14, 98 and 38, respectively. The effluent from the reaction zone is withdrawn from zone 16 and passed to heating and carbamate condensing zone 30 by means of line 20 and line 28 having depressurizing zone 24 situated thereon. Carbamate recycle is withdrawn from zone 30 through line 32 pressurized in zone 34 and introduced into reaction zone 16 through line 38. Partially degassed urea is withdrawn from zone 30 through line 48 and passed into second carbamate heating and condensing zone 44 wherein the remaining gases in the urea are recovered, condensed, and recycled to zone 30 through line 40. Urea solution is withdrawn from zone 44 to line 56 and passed into urea concentrating and ammonia recovery zone 60, and thereafter concentrated urea is withdrawn from zone 60 by means of line 70 and mixed with mother liquor recycle supplied by means of line 95. The mixture is introduced into crystallizer 84 by means of line 72 and line 80 having filter 74 situated thereon. Crystalline urea and associated mother liquor are withdrawn from crystallizer 84 by means of line 88 and introduced into centrifuge 92 wherein urea crystals are separated and withdrawn through line 102 from mother liquor, which is withdrawn from the centrifuge through line 94. The mother liquor in line 94 is split into two portions, one of which is introduced into reaction zone 16 by means of line 98 and line 96 having pressurizing zone 97 positioned thereon, and another portion of which is recycled to the urea crystallizer 84 as hereinbefore mentioned. The crystals of urea withdrawn through line 102 are passed through dryer 106, line 110, cooler 112, and line 116, wherein they are mixed with recycle granules from line 138 and introduced into crystal compacting and granulating zone 120. The granules are withdrawn from machine 120 by means of conduit 124 and graded for size in screener 130 prior to being withdrawn to storage through line 134. Having thus briefly described the flow of material through the process shown in the figure, a detailed description of the process depicted in the figure is now presented.

Ammonia and carbon dioxide in the ratio between about 2.0:1 and about 15:1, preferably between about 2.5:1 and about 4:1 which are pressurized by means of compressors, not shown in the figure, are introduced through line 10 and line 14, respectively, into urea reaction zone 16. Mother liquor from crystallizer 84 containing between about 70 and about 85 percent urea, the urea having a biuret content generally between about 1 and about 6 percent by weight of the urea and preferably less than 2 percent by weight of the urea is introduced through line 98 into urea reaction zone 16. Liquid carbamate recycle withdrawn from heating and carbamate condensing zone 30 is introduced through line 38 into urea reaction zone 16 by means of line 32, having pressure increasing zone 34 contained thereon. Reaction zone 16 is maintained at a pressure of between about 1,700 p.s.i.a. and about 3,500 p.s.i.a., preferably between about 2,400 p.s.i.a. and about 3,000 p.s.i.a., and a temperature of between about 300° and about 500° F., and preferably between about 330° and 400° F. The gaseous reactants form ammonium carbamate as an intermediate product, which in turn, is converted to urea and water; and the biuret introduced in the mother liquor recycle stream is converted to urea. Since the over-all reaction is exothermic and also highly corrosive, this step of the process is usually carried out in a synthesis reactor or autoclave lined with stainless steel and jacketed for cooling with water or other convenient coolant. Residence time in the reactor is controlled to between about ⅓ and about 3 hours and preferably to between about ½ and about 1 hour, after which the mixture in the reaction zone is withdrawn through line 20 as a liquid, expanded in a pressure reduction zone 24, and introduced through line 28 into a first heating and carbamate condensing zone 30. Operating within the broad range of conditions, the biuret content of the urea entering zone 30 is between about 0.05 and about 0.4 percent by weight of the urea. For operation within the preferred limits the biuret concentration of the urea entering zone 30 is between about 0.1 and about 0.3 percent by weight of the urea.

In zone 30, the liquid mixture, expanded to a pressure of between about 130 p.s.i.g. and about 400 p.s.i.g., is heated to vaporize ammonium carbamate as ammonia and carbon dioxide. The resulting vapors are separated from the urea, which remains as a liquid, and are condensed thereafter in the presence of water and free ammonia to reform ammonium carbamate. The carbamate condensate is withdrawn from zone 30 through line 32, passed to pressure increasing zone 34, wherein the carbamate is pressurized to approximately the same pressure as that utilized in zone 16, and then introduced through line 38 into urea reaction zone 16. The temperature of the ammonium carbamate condensate is maintained above the "salting-out" temperature of the carbamate, in order to insure a completely liquid recycle, and below the temperature employed in zone 16 in order to aid in effecting temperature control over the highly exothermic reaction.

Aqueous urea solution is withdrawn from zone 30 by means of line 48 and passed to second heating and carbamate condensing zone 44. Zone 44 is maintained at a pressure between about 0 p.s.i.g. and about 50 p.s.i.g., preferably between about 10 p.s.i.g. and about 20 p.s.i.g. In zone 44 the solution is again heated to vaporize from the solution ammonium carbamate as ammonia and carbon dioxide. These vapors are thereafter condensed in the presence of ammonia and water to reform the carbamate; withdrawn as liquid from zone 44 through line 40 and are introduced into the ammonium carbamate condensing section of zone 30.

Each of heating and carbamate condensing zones 30 and 44 preferably employed in the urea synthesis process, herein described, is a two compartment pressure vessel lined with stainless steel. The upper part of each vessel is a gas-liquid separator and the lower part is a condenser, equipped with a stainless steel water-cooled coil, each part being adapted by means of the proper valves and other means to accommodate the ingress and egress of the appropriate quantities of materials.

In each carbamate condenser, unreacted ammonia and carbon dioxide enter through a downcomer pipe and, as a result of cooling, condense and react to form aqueous ammonium carbamate solution which solution is withdrawn from the bottom of each carbamate condenser and recycled to the urea reactor.

The remaining liquid fraction in zone 44 is withdrawn through line 56 and introduced into ammonia recovery and water eliminating zone 60, wherein urea solution is concentrated to between about 70 and about 85 percent by weight of solution and wherein residual ammonia is separated from the solution.

A preferred method of operating the ammonia recovery and water eliminating zone 60 includes passing the remaining liquid fraction withdrawn from the second heating and carbamate condensing zone through a heater wherein the liquid fraction is heated to a temperature of between about 200° and about 310° F. under from about 0 p.s.i.g. to about 50 p.s.i.g. and then introducing the heated friction into a concentrator. Entering the heater the liquid fraction preferably contains not more than 5 percent unconverted reactants, namely ammonia and carbon dioxide, the percentage being based on the reactants in the reactor effluent. In the concentrator the mixture is separated into a vaporous reactant phase and a liquid phase so that liquid urea concentrated to between about 70 and about 85 percent by weight of solution, substantially free of unconverted reactants, is withdrawn through line 70 to be further processed as hereinafter described. The vaporous phase is passed to a primary condenser wherein the vapors are partially condensed by indirect heat exchange with water or other coolant means circulating through an internal refrigeration coil. As the vapors progress through the condenser, the temperature is controlled in a gradually and decreasing manner so that at the entrance port the temperature is between about 200° and about 300° F., while at the exit of the condenser the temperature is preferably between about 150° and about 250° F.

The condenser is so disposed that the passage of vapors through it is maintained in its upper portion and contact with continuously condensing, and condensed water in the bottom portion of the condenser is avoided. As a result of this partial condensation, a liquid stream of water containing not more than 5 weight percent ammonia is withdrawn from the lower portion of the condenser, whereas a vaporous fraction composed of at least 20 weight percent ammonia and carbon dioxide, is withdrawn from the top of the condenser and passed to a water separator.

In the water separator, a small amount of liquid water, which is entrained with vapors, is separated by gravity and withdrawn to be admixed with water condensate from the primary condenser.

The resulting vapors from the water separator, which are concentrated in ammonia and carbon dioxide, are passed into a secondary condenser wherein the vapors are totally condensed by contact with water in an indirect heat exchanger. The totally condensed vapors are withdrawn from the secondary condenser and a portion thereof recycled to the top of the secondary condenser. A portion of the liquid material is sprayed into the secondary condenser at a point above the entrance of the vapors from the water separator. Thus, the recycled condensate aids in lowering the temperature of the incoming vapors and provides intimate contact therewith to obtain an equilibrium mixture in the condenser.

All, or a portion of the water withdrawn from the primary condenser and the water separator can be removed from the system and passed to waste by means of line 64. However, a small proportion of this water can be admixed, in a controlled amount, with concentrated condensate withdrawn from the secondary condenser and recycled to the secondary heating and carbamate condensing zone for admixture with ammonium carbamate separated therein. Since a small amount of water is beneficial in the process, for maintaining ammonium carbamate in solution, the ammonia-carbon dioxide condensate recycled to the second heating and carbamate condensing zone preferably contains between about 60 and about 80 percent water.

The urea solution withdrawn through line 70, concentrated to an appropriate degree, as hereinbefore described, contains less than about 0.5 percent, and preferably less than about 0.4 percent by weight biuret, based on the urea. The solution is mixed with mother liquor recycle from line 95 such that a urea solution is obtained which contains between about 1 and about 2 percent by weight biuret, based on the urea. The quantity of urea present in the feed to the crystallizer is maintained between about 70 and about 85 percent based on the total solution weight, by controlling the degree of concentration in zone 60. This stream is passed from line 72 through filter 74, and through line 80 into crystallizer 84. Crystallizer 84 is maintained at a temperature between about 100° and about 200° F., and preferably between about 150° and about 180° F., under pressures of between about 2 p.s.i.a. and about 5 p.s.i.g., and preferably at substantially atmospheric pressure, in which case no pressure control is necessary. In accordance with the preferred embodiment, crystals of urea continuously nucleate and grow from the solution which is maintained super-saturated by the evaporation of water from solution. As an aid in maintaining supersaturation in the crystallizer, air at between about room temperature (68° F.) and about 150° F. is continuously introduced through line 82. Air and water vapor are vented through line 86 at the top of crystallizer 84. Urea crystals and associated mother liquor are withdrawn, preferably continuously, from crystallizer 84 through line 88 at a rate controlled by valve 90 such that the residence time in crystallizer 84 is between about 10 and about 100 minutes, and preferably between about 30 and about 60 minutes.

Urea crystals are separated from the associated mother liquor in centrifuge 92. Mother liquor is withdrawn from the center portion of centrifuge 92 through line 94 and split into two streams. One stream is passed through line 96 into pressure increasing zone 97, wherein the liquid is pressurized to about the same pressure as that in urea reaction zone 16, and then introduced into reaction zone 16 through line 98 as hereinbefore described. The other stream is recycled back to the crystallizer through line 95 to control the ratio of mother liquor to crystals of urea in the crystallizer. The mother liquor in line 94 is split such that the ratio of recycle passing to the reaction zone 16 to recycle passing to crystallizer 84 is maintained generally between about .02:1 and about 0.3:1, and for preferred operation between about .05:1 and about 0.1:1. When the liquor in line 94 is split according to the broad range of ratios, and the conditions in reaction zone 16 are maintained within the broad range of operating conditions, the biuret content of the mother liquor in the crystallizer and in stream 94 remains lower than about 2 percent by weight biuret, based on urea in the mother liquor; when the split of liquor in stream 94 is made within the preferred range, and when the operation of urea reaction zone 16 is within the preferred range of conditions, the mother liquor in the crystallizer remains lower than about 2 percent by weight biuret, based on urea in the mother liquor. The concentration of biuret in the crystals so produced is held to less than about 0.2 percent.

Referring now to the low biuret crystals produced in crystallizer 84 and separated from the associated mother liquor in centrifuge 92, these crystals are withdrawn from the periphery of the centrifuge through line 102 to crystal dryer 106, maintained at a temperature between about 150° and about 250° F., wherein substantially all remaining associated moisture is removed from the crystals. Through line 110, crystals are introduced into crystal cooler 112, where they are cooled to a temperature between about 68° and about 120° F. before they are compacted. The dried and cooled crystals are introduced through line 116 into crystal compacting and granulating machine 120 wherein the urea is compacted and formed into granules, which range in diameter from between about 1.0 to about 2.5 millimeters. In machine 120, the crystals drop from a hopper into the compacting rolls. The crystals are compacted into a homogeneous sheet, which is usually brittle, and which is broken into flakes by suitable means, such as finger-type flakers. The flakes are then passed to granulating rolls to obtain particles of the desired size. The best product is achieved when a pressure between about 1000 and about 2000 pounds per inch of roller length and a short contact time is employed between the compactor rolls. A short contact time is especially important in the production of particles without increasing the biuret content over that in the crystals. Granules are withdrawn from machine 120 through line 124, and introduced into granule screener 130 where the fines and the oversize granules are separated from the product of desired size, and recycled to the crystal compactor through line 138. The granules having the desired diameter are withdrawn through line 134 to pellet storage, not shown in the figure.

According to this invention a total recycle urea process is provided whereby there is substantially no net production of the undesired side product, biuret; whereby there is substantially total conversion of ammonia and carbon dioxide, reactants; whereby the total product is economically crystallized; and whereby substantially pure non-caking granules of urea are produced suitable for all industrial and agricultural applications.

It is to be understood that many modifications and alterations of the above described process will become apparent to those skilled in the art without departing from the scope of this invention. For example, the urea effluent from the synthesis reactor is degassed in a single heating and carbamate condensing zone or in a plurality thereof, or by means other than those heretofore described such as, for example, by standard heat exchange and gas-liquid separating means. The operation may be such that the carbamate recycle is eliminated in part and even entirely without departing from the scope of this invention. Crystallizers and crystallization operations differing substantially from those described herein, operating either batchwise or continuously, are likewise employed. Although it is preferred to compact and granulate the crystalline product of the process of this invention, the crystals are also pelletted or briquetted. Furthermore, biuret containing urea withdrawn directly from degassing operations or from other sources is converted to urea in the urea reaction zone, singularly or in conjunction with a mother liquor recycle stream withdrawn from a crystallizer without departing from the scope of this invention.

*Example*

The following example, carried out in accordance with the process of this invention further illustrates the process of this invention but is not to be construed as unduly limiting thereof.

Referring to the figure of the drawing to illustrate the flow of materials between the several zones described herein, urea is produced at elevated temperatures and pressures in a synthesis reactor lined with stainless steel, shown in the figure as reaction zone 16, from carbon dioxide, ammonia, carbamate recycle and biuret-containing mother liquor recycle. The flow rates of the feed lines to the synthesis reactor is as follows: 13,600 pounds per hour of carbon dioxide introduced through line 10, 10,480 pounds per hour of ammonia introduced through line 14, 53,600 pounds per hour of carbamate recycle introduced through line 38, and 4,630 pounds per hour of mother liquor from crystallizer 84 introduced through line 98. The mother liquor introduced through line 98 contains 1.9 percent biuret, based on the weight of urea in the liquor, which is 3700 pounds per hour. The synthesis reactor is maintained at a temperature of 380° F. under a pressure of 2800 p.s.i.a., and residence time in the reactor is ¾ hour. The reactor effluent withdrawn through line 20 comprises 22,200 pounds per hour of urea containing 0.2 percent by weight biuret based on the urea. The reactor effluent is reduced in pressure to 250 p.s.i.g. in pressure reducing zone 24 prior to degassing and concentrating. Urea is concentrated to 80 percent by weight in aqueous solution by treatment in two heating and carbamate condensing zones and by further treatment in a concentrator. The biuret content of the urea which emerges through line 70 is 0.4 percent by weight of the urea. The urea in this stream is mixed with recycle liquor from line 95 in line 72 such that 74,000 pounds per hour of urea are introduced through filter line 80 into crystallizer 84. The composition of this feed is as follows: 18,570 pounds per hour water, 74,000 pounds per hour urea, having a biuret concentration of 1.4 percent, based on the weight of urea. The operation of the crystallizer is essentially isothermal and isobaric, a temperature of 168° F. being maintained in the crystallizer. No control is maintained over the pressure in crystallizer 84 resulting in substantially atmospheric operation. Air is introduced through line 82 near the base of the crystallizer at the rate of 13,000 cubic feet per minute at a temperature of 100° F. Crystals of urea and mother liquor associated therewith are continuously withdrawn through line 88 at a rate controlled by valve 90 to centrifuge 92. Crystals are continuously removed from the centrifuge at the rate of 18,500 pounds per hour, and mother liquor is continuously removed from the centrifuge at the rate of 71,600 pounds per hour. The biuret content of the crystals is 0.19+ percent by weight and the biuret content in the mother liquor is 1.9 percent based on the weight of urea in the liquor. The liquor is passed through line 94 to lines 95 and 96 where it is split in the ratio of 0.065 parts in line 96 which is recycled to the reaction zone, and 1 part in line 95 which is recycled to the urea crystallizer. The crystalline urea, which has a biuret content of 0.19+ percent, as hereinbefore stated, is heated to remove residual mother liquor, cooled, compacted and granulated, and screened to yield a product of uniform size. The temperature of drier 106, in which the crystals are allowed to reside for 10 minutes, is maintained at 200° F. The dried crystals are cooled for 10 minutes in cooler 112 maintained at a temperature of 100° F. before being withdrawn through line 116 where they are mixed with 4500 pounds per hour of recycle granules from the screening operation through line 138 and introduced through line 116 to compacting and granulating machine 120. In compacting and granulating machine 120, urea crystals are compacted between rolls exerting a pressure of 1500 pounds per inch of roller length at a temperature of 100° F., and granulated in another portion of the machine. The granules, graded in screener 130 to obtain granules having an average equivalent diameter of 1.7 millimeters, comprise 0.2 percent by weight biuret which is substantially the same as the biuret content of the crystals withdrawn from the centrifuge. The granules, which are substantially non-caking, are sent to storage at a rate of 18,500 pounds per hour.

Having described my present invention, I claim:

1. In a process for recovering high purity urea crystals in which ammonia and carbon dioxide are reacted in a reaction zone under urea synthesis conditions to produce an aqueous reaction effluent containing urea of low biuret content; said effluent is treated under a reduced pressure to substantially completely remove ammonia and carbon dioxide gases and a portion of the water from said effluent, thereby providing a concentrated aqueous urea solution of appreciable biuret content; said concentrated aqueous urea solution is passed to a crystallization zone maintained under conditions to produce high purity urea crystals from a urea-containing crystallization mother liquor which is thereby enriched in biuret, the improvement which comprises: continuously withdrawing a portion of said crystals and said biuret-enriched urea-containing liquor from said crystallization zone, separating said liquor from said crystals, passing a major portion of said liquor back to said crystallization zone to control the ratio of mother liquor to crystals of urea in said crystallization zone, passing the remaining portion of said liquor to said reaction zone to convert the biuret content thereof to urea and to recover the urea content of the liquor.

2. The process of claim 1 wherein the ratio of biuret-enriched urea-containing liquor passed to said reaction zone to the liquor which is recycled to the crystallization zone is maintained between about 0.02:1.0 and about 0.3:1.0 such that the biuret content of said liquor is maintained between about 1 and about 6 percent biuret based on the weight of urea.

3. In a process for recovering high purity urea crystals in which ammonia and carbon dioxide are reacted in a reaction zone under urea synthesis conditions to produce an aqueous reaction effluent containing urea of low biuret content; said effluent is treated under a reduced pressure to substantially completely remove ammonia and carbon dioxide gases and a portion of the water from said effluent, thereby providing a concentrated aqueous urea solution of appreciable biuret content; said concentrated aqueous urea solution is passed to a crystallization zone maintained under conditions to produce high purity urea crystals from a urea-containing crystallization mother liquor which is thereby enriched in biuret, the improvement which comprises: continuously withdrawing a portion of said crystals and said biuret-enriched urea-containing liquor from said crystallization zone, separating said liquor from said crystals, passing between about 0.05 and about 0.1 part of said liquor to said reaction zone to convert the biuret content thereof to urea and to recover the urea content thereof, and passing the remaining portion of said liquor back to said crystallization zone to control the ratio of mother liquor to crystals of urea in the crystallization zone thereby maintaining the biuret content of the crystallization mother liquor less than about 2 percent by weight biuret and producing crystals containing less than about 0.2 percent biuret.

4. The process of claim 1 wherein the mole ratio of said ammonia and carbon dioxide, on a combined basis, to biuret in said liquor is maintained between about 4,000:1 and about 12,000:1 in said reaction zone.

5. The process of claim 1 wherein said crystallization mother liquor comprises between about 70 and about 85 percent by weight urea and between about 1 and about 6 percent biuret based on the weight of urea.

References Cited by the Examiner

UNITED STATES PATENTS

| 2,854,482 | 9/1958 | Guyer | 260—555 |
| 2,913,493 | 11/1959 | Sze et al. | 260—555 |

FOREIGN PATENTS

| 226,148 | 11/1958 | Australia. |
| 1,127,788 | 12/1956 | France. |

OTHER REFERENCES

Kume: Petroleum Refiner, vol 39, No. 3 (1960) pages 200–01, TP 690 A1P4.

NICHOLAS S. RIZZO, *Primary Examiner.*

IRVING MARCUS, *Examiner.*